United States Patent [19]

Takahashi et al.

[11] Patent Number: 5,577,914

[45] Date of Patent: Nov. 26, 1996

[54] DEVICE FOR REPRESENTING BRAILLE ON INFORMATION SIGNAL RECORDING MEDIUM AND DISC CARTRIDGE

[75] Inventors: Kenji Takahashi, Miyagi; Hirotoshi Fujisawa, Tokyo, both of Japan

[73] Assignee: Sony Corporation, Tokyo, Japan

[21] Appl. No.: 333,336

[22] Filed: Nov. 2, 1994

[30]     Foreign Application Priority Data

Nov. 8, 1993  [JP]  Japan .................................. 5-278463
  Dec. 29, 1993 [JP]  Japan .................................. 5-355386

[51] Int. Cl.⁶ .................................................. G09B 21/00
[52] U.S. Cl. .......................... 434/113; 283/79; 206/459.5
[58] Field of Search ............................. 434/113, 112; 206/459.5, 307, 232; 40/642; 283/79, 74

[56]                References Cited

U.S. PATENT DOCUMENTS 3,784,763   1/1974   Budrose ............................. 434/113 X
  3,942,016   3/1976   Schatz .
  4,784,408  11/1988   Yasuda .
  4,789,058  12/1988   Blaney ................................. 206/232
  5,119,933   6/1992   Taylor .................................. 206/232

FOREIGN PATENT DOCUMENTS 2263269    7/1993   United Kingdom ............... 434/113

Primary Examiner—Cary E. O'Connor
Assistant Examiner—Jeffrey A. Smith
Attorney, Agent, or Firm—Ronald P. Kananen

[57]                 ABSTRACT

A disc cartridge having a cartridge main body and a shutter member is disclosed. The cartridge main body contains a disc-shaped recording medium and includes an aperture formed in one of a pair of planar portions for exposing at least an information recording area of the disc-shaped recording medium to outside. The shutter member opens or closes the aperture and is movably mounted on the cartridge main body. A braille representing portion for indicating the type of the disc-shaped recording medium is formed on a shutter member of the disc cartridge, a container casing containing the disc cartridge or an index sheet arranged between the disc cartridge and the packaging film sheet and acting as a sheath on which the braille representing portion is formed.

9 Claims, 15 Drawing Sheets

DEVICE FOR REPRESENTING BRAILLE ON INFORMATION SIGNAL RECORDING MEDIUM AND DISC CARTRIDGE

BACKGROUND

1. Field of the Invention

This invention relates to a device for representing braille points (raised letters) for a recording medium. More particularly, it relates to a device for representing braille (raised letters) for a recording medium having a braille information representing portion for indicating the type of the recording medium.

2. Background of the Invention

Up to now, a disc cartridge comprising a disc, such as an optical disc or a magnetic disc, as an information signal recording medium, on which information signals, such as music signals or picture signals, are pre-recorded or are to be recorded, and a cartridge main body containing the disc therein, and a tape cartridge comprising a magnetic disc, as an information signal recording medium, on which information signals, such as music signals or picture signals, are prerecorded or are to be recorded, and a cartridge main body containing the tape therein, have been put to use. Plural types of disc cartridges or tape cartridges are available in order to meet various types of the applications and usages. As for the disc cartridges, plural versions thereof having different recordable time periods and recording capacities are available depending on the types of the optical disc or the magnetic disc as the information recording medium.

For example, in the case of a disc cartridge having an optical disc 64 mm in diameter, contained in a cartridge main body, plural disc cartridges having different recordable time durations for information signals, such as music signals, and a common size and outer shape of the cartridge main body, are available depending on the types of the optical disc contained in the cartridge main body. In the case of a disc cartridge having a magnetic disc contained in a cartridge main body, plural disc cartridges having different recordable time durations for information signals and a common size and outer shape of the cartridge main body, are available depending on the types of the magnetic disc contained in the cartridge main body. In addition, in the case of a tape cartridge having a magnetic tape contained in a cartridge main body, plural tape cartridges having different recordable time durations for information signals, such as music signals, and a common size and outer shape of the cartridge main body, are available depending on the lengths and types of the magnetic tape contained in the cartridge main body. These disc cartridges and tape cartridges cope with variable types of applications and usages by changing only the disc or tape contained in the cartridge main body, while maintaining the common shape of each cartridge main body, as described above. However, the disc or tape type cannot be identified on viewing the cartridge from outside, since each cartridge main body is of the common shape. Consequently, this type of the disc or tape cartridge is provided with an indication indicating the recordable time and recording capacity for information signals for the types of the disc or tape contained in the main cartridge body. This indication is provided, such as by printing, on the outer surface of the cartridge main body or on the surface of a shutter movably mounted on the cartridge main body. By such indication, the recordable time or the recording capacity may be visually identified even with the disc cartridge or the tape cartridge having the common size and outer shape of the cartridge main body.

The above indication indicating the recordable time or the recordable capacity for information signals provided on the disc cartridge or the tape cartridge is mainly designed for visual discrimination by characters or figures. Such indication mainly enabling the visual discrimination renders the discrimination extremely difficult or even impossible for the blind or weakly sighted users.

On the other hand, the disc or tape cartridge is distributed to retail shops in the state of being packaged in a packaging film sheet, for protecting the disc or tape contained in the cartridge main body and preventing damage or pollution to the surface of the cartridge main body.

In addition, a printed sheet or label indicating the recording contents recorded on the disc or tape contained in the cartridge main body or indicating the identification symbol of the cartridge itself is affixed on the disc or tape cartridge. This printing sheet sheathes the outer surface of the disc or tape cartridge and is packaged along with the cartridge in a packaging sheet film. As a result, the indication of the recordable time or the recording capacity applied on the disc or tape cartridge is hidden by the printing sheet and cannot be identified visually.

There is also a disc cartridge or a tape cartridge which is distributed on a retail route in a state of being contained in a container casing packaged by a packaging film sheet. Once the disc or tape cartridge is contained in such container casing, the indication on the cartridge main body cannot be identified visually.

Recently, attempts have been made to indicate the type of the information recording medium using the discrimination indication of convex and concave shapes for weakly sighted or blind users. For example, in a compact cassette containing a magnetic tape capable of recording speech signals, convexed or recessed identification marks for discrimination between sides A and B of the main cassette body or convexed or recessed arrow marks for identification of the recordable time for the weakly sighted or blind users are applied separately from the usual printing. These marks are formed using a metal mold for injection molding of the cassette main body at the time of fabrication of the cassette main body.

If the convexed or recessed discrimination marks are inscribed on the cartridge main body of the disc cartridge, as means for grasping the recordable time or recording capacity by relying upon the user's tactile sense, as in the case of the compact cassette described above, the following methods may be employed. With a first method, the indication for discrimination is inscribed on the main cartridge body, at the time of fabrication of the cartridge main body by injection molding, using dedicated metal molds depending on the difference in the recordable capacity and the recording time. With a second method, disc cartridges having variable indication of the recordable capacity or the recording time is prepared using cores of metal molds for injection molding which are exchanged depending on the types of the disc cartridges.

With the first method, since the different types of the disc cartridges can hardly be discerned at the time of fabrication so that different types of the disc cartridges tend to be exchanged for one another through mistake thus presenting difficulties in product management.

With the second method, about eleven hours are consumed in exchanging the cores of the metal molds for injection molding. During this time, the molding operation for the cartridge main body has to be discontinued, with the result that the production efficiency becomes poor and the product yield is significantly lowered. The problem of mistaken exchange of different type cartridges is presented, as with the first method.

SUMMARY OF THE INVENTION

It is therefore an object of the present invention to provide a device for representing the braille on an information recording medium which resolves the above-mentioned problems.

It is another object of the present invention to provide a printing sheet for a cartridge containing an information recording medium which resolves the above-mentioned problems.

It is a further object of the present invention to provide a disc cartridge which resolves the above-mentioned problems.

In one aspect, the present invention provides a device for representing braille points on an information recording medium comprising a cartridge main body in the form of a rectangular casing for containing the information recording medium, sheathing means for sheathing the outer surface of the cartridge main body, and a braille point representing portion provided on the sheathing means at a position thereof readily touched by the user's hand or finger for indicating the type of the information recording medium contained in the cartridge main body.

In another aspect, the present invention provides a device for representing braille points on an information recording medium comprising a cartridge main body in the form of a rectangular casing for containing the information recording medium, a container casing containing the information signal recording medium, and a braille point representing portion provided on said sheathing means at a position thereof readily touched by the user's hand or finger for indicating the type of the information recording medium contained in the cartridge main body.

In a still another aspect, the present invention provides a device for representing braille points on an information recording medium comprising a cartridge main body in the form of a rectangular casing for containing the information recording medium, a paper-based member placed across at least a part of the planar portions facing one another and at least one of the lateral side sections narrower than the planar sections, a packaging film sheet packaged along with the paper-based member and the cartridge main body with the paper-based member placed across the planar portions and the lateral side section, and a braille point representing portion provided at a portion of the paper-based member ready to be touched by the user's hand or finger for indicating the type of the information recording medium contained in the cartridge main body.

In still another aspect, the present invention provides a printed sheet for a cartridge main body containing an information signal recording medium, comprising a first portion for covering at least a part of one of a pair of rectangular-shaped planar portions of the cartridge main body having the planar portions and plural lateral side sections provided along the sides of the planar portions interconnecting the planar portions, a second portion for covering at least a part of the other of the planar portions of the cartridge main body, a connecting web portion facing at least one of the lateral side sections of the cartridge main body for interconnecting the first and second portions, and braille point information representing means formed on the connecting web portion for indicating the type of the information signal recording medium contained in the cartridge main body. In yet another aspect, the present invention provides a disc cartridge comprising a cartridge main body containing a disc-shaped recording medium and having an aperture formed in at least one of the planar portions for exposing an information recording region of a disc-shaped recording medium to outside, a shutter member movably mounted on the cartridge main body for opening and closing the aperture and discriminating means in the form of projections and recesses provided on the shutter member for indicating the type of the disc-shaped recording medium contained in the cartridge main body.

In accordance with the present invention, by providing the braille information representing portion indicating the type of the recording medium contained in the cartridge main body at a position of a member sheathing the outer surface of a cartridge main body containing a recording medium readily touched by the user's hand or finger, such as a container casing or a paperbased member, e.g., an index sheet, the type of the recording medium may be easily identified by tactile sense even if the cartridge main body is packaged in a packaging film sheet.

In accordance with the present invention, by providing discriminating means in the form of projections or recesses on the shutter member for the disc cartridge, the type of the recording medium or the disc cartridge may be identified by tactile sense.

DESCRIPTION OF THE INVENTION

Figure 1:
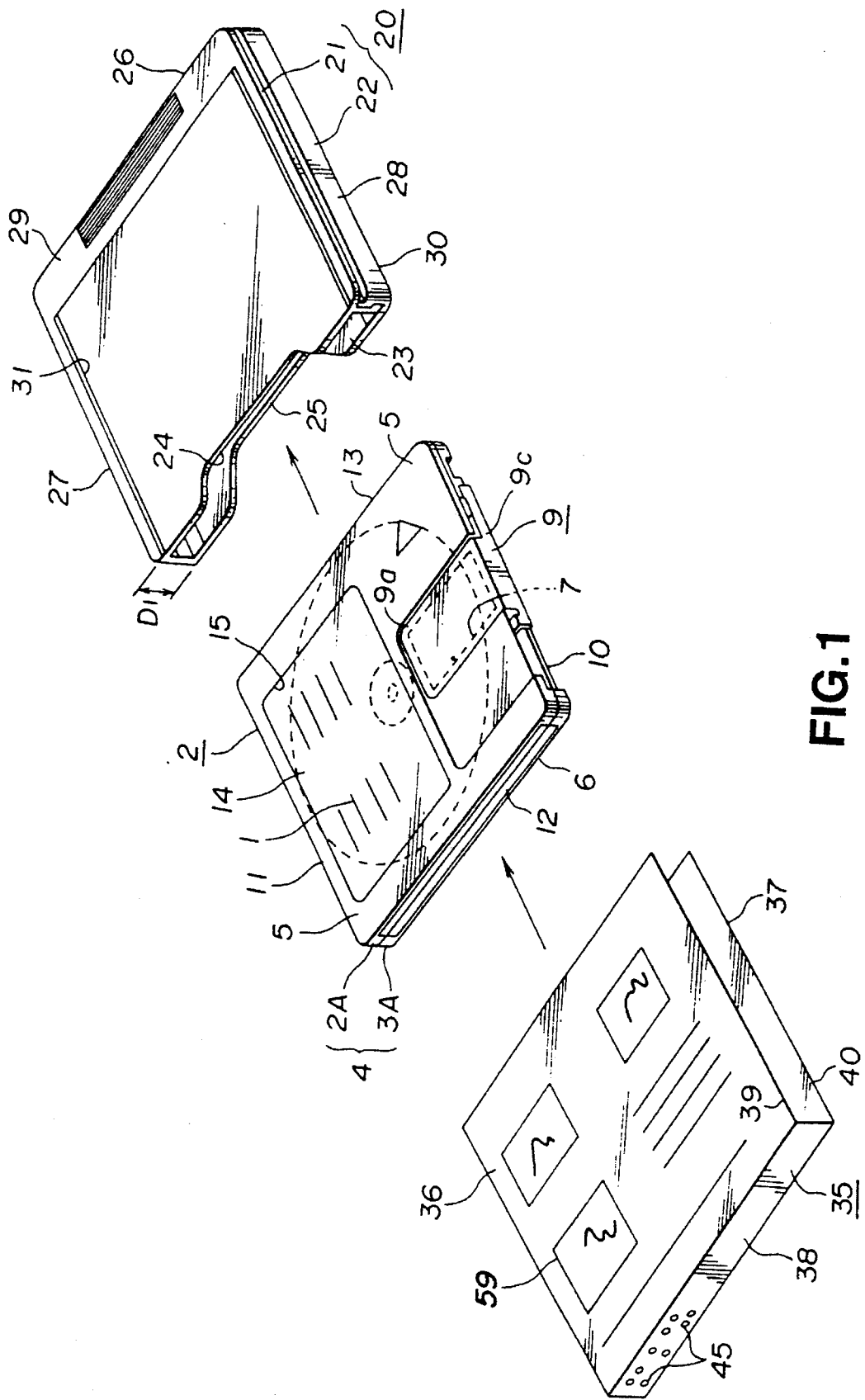
FIG. 1 is an exploded perspective view showing a braille representing device according to a first embodiment of the present invention, as viewed from above.

Referring to the drawings, the braille representing device for the information signal recording device according to the present invention and the disc cartridge will be explained in detail.

The following description will be made of a disc cartridge containing an optical disc 64 mm in diameter as the information recording medium the type of which is indicated by the braille representing device according to the present invention.

A disc cartridge 2, containing an optical disc 1, the type of which is indicated by a braille representing device according to the present invention, includes a cartridge main body 4, as shown in FIG. 1. The cartridge main body 4 is constituted by abutting and interconnecting an upper half 2A and a lower half 3A each of which is molded from a synthetic resin, such as acrylic resin, ABS resin, polycarbonate resin or polystyrene and each of which is rectangular in plan and formed with upstanding peripheral wall sections. The optical disc 1 is rotatably contained within the cartridge main body 4. The optical disc 1 contained in the cartridge main body 4 is e.g. a magneto-optical disc, approximately 64 mm in diameter, capable of re-recording information signals corresponding to the play time of approximately 74 minutes of analog audio signals.

Figure 2:
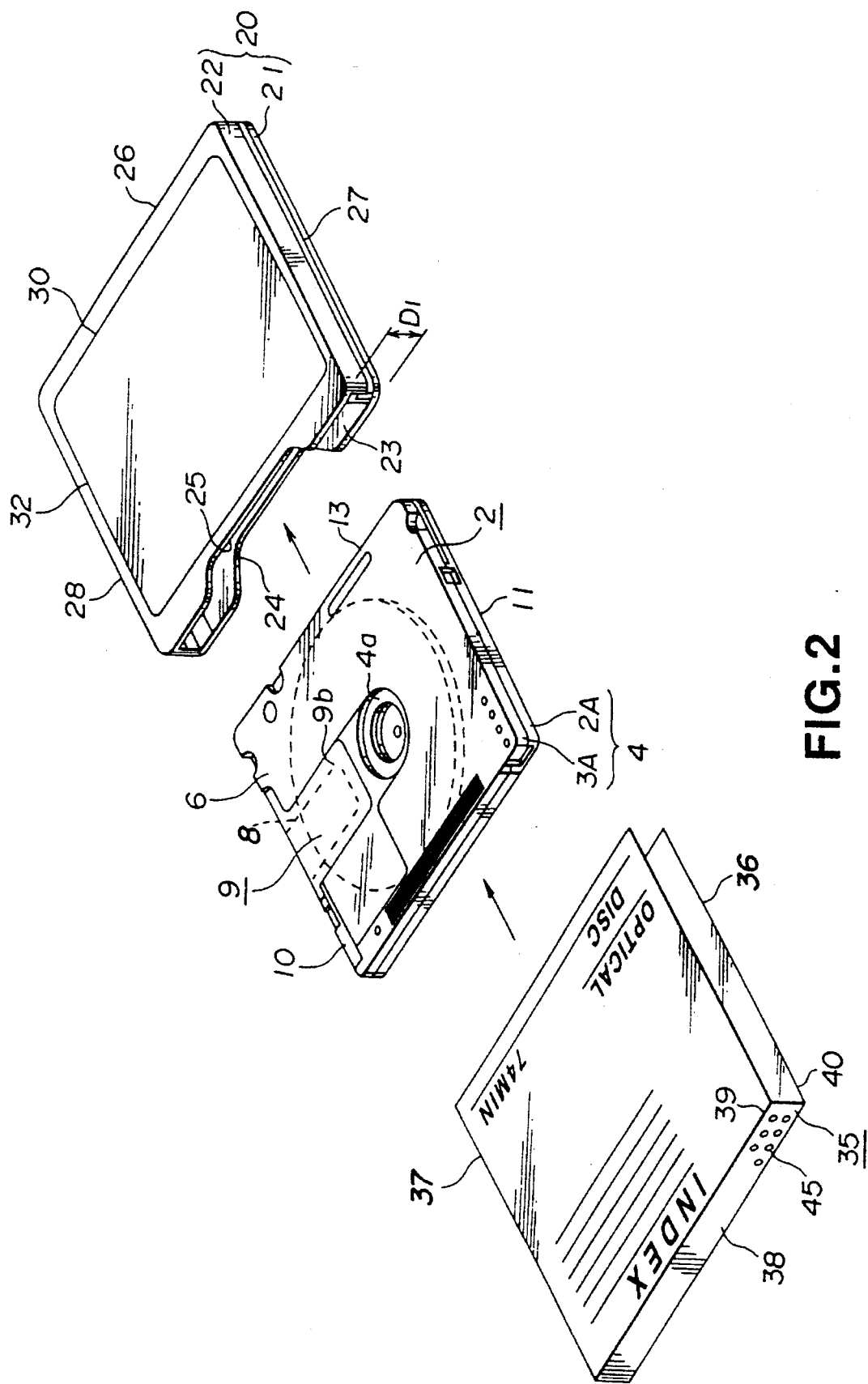
FIG. 2 is an exploded perspective view showing the braille representing device according to the first embodiment of the present invention, as viewed from below.

In planar sections 5, 6 of larger area of the cartridge main body 4 containing the recordable optical disc 1, facing each other, are formed recording/reproducing apertures 7, 8 respectively faced by an optical head for recording/reproducing information signals, such as music signals, and a head for application of an external magnetic field, respectively. These recording/reproducing apertures 7, 8 are dimensioned to expose a portion of a recording region of thee optical disc 1 contained in the cartridge main body 4. The apertures 7, 8 are disposed at a mid portion of the cartridge main body 4 along the transverse direction thereof for extending from near the center of the planar sections 5, 6 to the vicinity of a front lateral section 10. In a mid portion of the lower half 3A of the cartridge main body 4 is formed an aperture 4a for inserting a disc table constituting a disc rotating driving unit for rotating the optical disc 1 contained in the cartridge main body 4, as shown in FIG. 2.

On the cartridge main body 4, a shutter member 9 for opening and closing the recording/reproducing apertures 7, 8 formed in the cartridge main body 4 is mounted for movement relative to the cartridge main body 4. The shutter member 9 is formed by punching and bending a thin metallic sheet or by molding a synthetic resin material. The shutter member 9 has a pair of plate-shaped portions 9a, 9b, having a U-shaped cross-section, and interconnected by connecting web portion 9c. The plate-shaped portions 9a, 9b face each other and are dimensioned to close the recording/reproducing apertures 7, 8. The shutter 9 is movably mounted on the cartridge main body 4 by being fitted at the front lateral section 10 so that the plate-shaped sections 9a, 9boverlie the recording/reproducing apertures 7, 8. When in the non-use position of not being loaded on the recording and/or reproducing apparatus, the shutter member 9 is engaged by a lock piece of a lock member, not shown, provided in the cartridge main body 4, and thereby maintained in a locked state at the position of closing the recording/reproducing apertures 7,8.

The optical disc 1, employed as a recording medium for information signals, is of a thickness which is extremely small as compared to its diameter. For example, the optical disc 1 having a diameter of approximately 64 mm, has a thickness on the order of 1.2 mm. The cartridge main body 4, containing the disc-shaped recording medium, such as the optical disc 1 having a reduced thickness as compared to the size of its planar sections, has its front lateral section 10, back lateral section 11, on the opposite side of the lateral section 10, and lateral side sections 12, 13 of narrower width, extending at right angle to the front and back lateral sections 10, 11.

On the upper planar section 5 of the cartridge main body 4 is formed a label affixing portion 15 on which is stuck an indicating label 14 stating the contents of the information signals recorded on the optical disc contained in the cartridge main body 4, as shown in FIG. 1. The contents of the information signals may be directly inscribed on the label affixing portion 15. The label affixing portion is provided at a region which is not hidden by the shutter member 9 moved in the direction of opening or closing the recording/reproducing apertures 7, 8.

The disc cartridge 2 containing the optical disc 1 is contained in a rectangular container casing 20 corresponding in size to the disc cartridge 2, as shown in FIGS. 1 and 2. The container casing 20 is constituted by abutting and interconnecting a pair of casing halves 21, 22 molded from a synthetic material, such as acrylic resin, ABS resin, polycarbonate resin or polystyrene.

The front lateral section constituting the lateral surface of the container casing 20 is opened to provide a cartridge inserting/detachment opening 23. At a mid portion of the front lateral sections of the upper and lower casing halves 21, 22 defining the cartridge inserting/detachment opening 23 are formed cut-outs 24, 25 acting as a finger rest for gripping the disc cartridge 2. Thus the cut-outs 24, 25 allow a portion of the disc cartridge 2 to be exposed to outside in order to permit the container casing 20 to be gripped by the user's hand or finger.

The sides of the container casing 20 other than the front lateral section having the cartridge inserting/detachment opening 23, that is the back lateral section 26 and the lateral side sections 27, 28 extending at right angles to the rear lateral section 26, are formed by abutting the upstanding peripheral wall sections formed on the outer perimeter of the planar sections of the upper and lower casing halves 21, Label affixture portions 31, 32 for affixing indicating labels, are formed in planar sections 29, 30 facing the planar sections 5, 6 of the disc cartridge 2 contained in the casing 20, as shown in FIGS. 1 and 2. Similarly to the indicating label 14, fixed to the label affixture portion 15 of the disc cartridge 2, the indicating labels affixed to the label affixing portion 31, 32 are used for stating the recording contents or archives of the information signals recorded on the optical disc 1 contained in the disc cartridge 2 contained in the container casing 20.

The container casing 20 for containing the disc cartridge 2 having the lateral side sections of a smaller width than the planar sections 5, 6 has its lateral side section smaller in area than the planar sections 29, 30.

Figure 3:
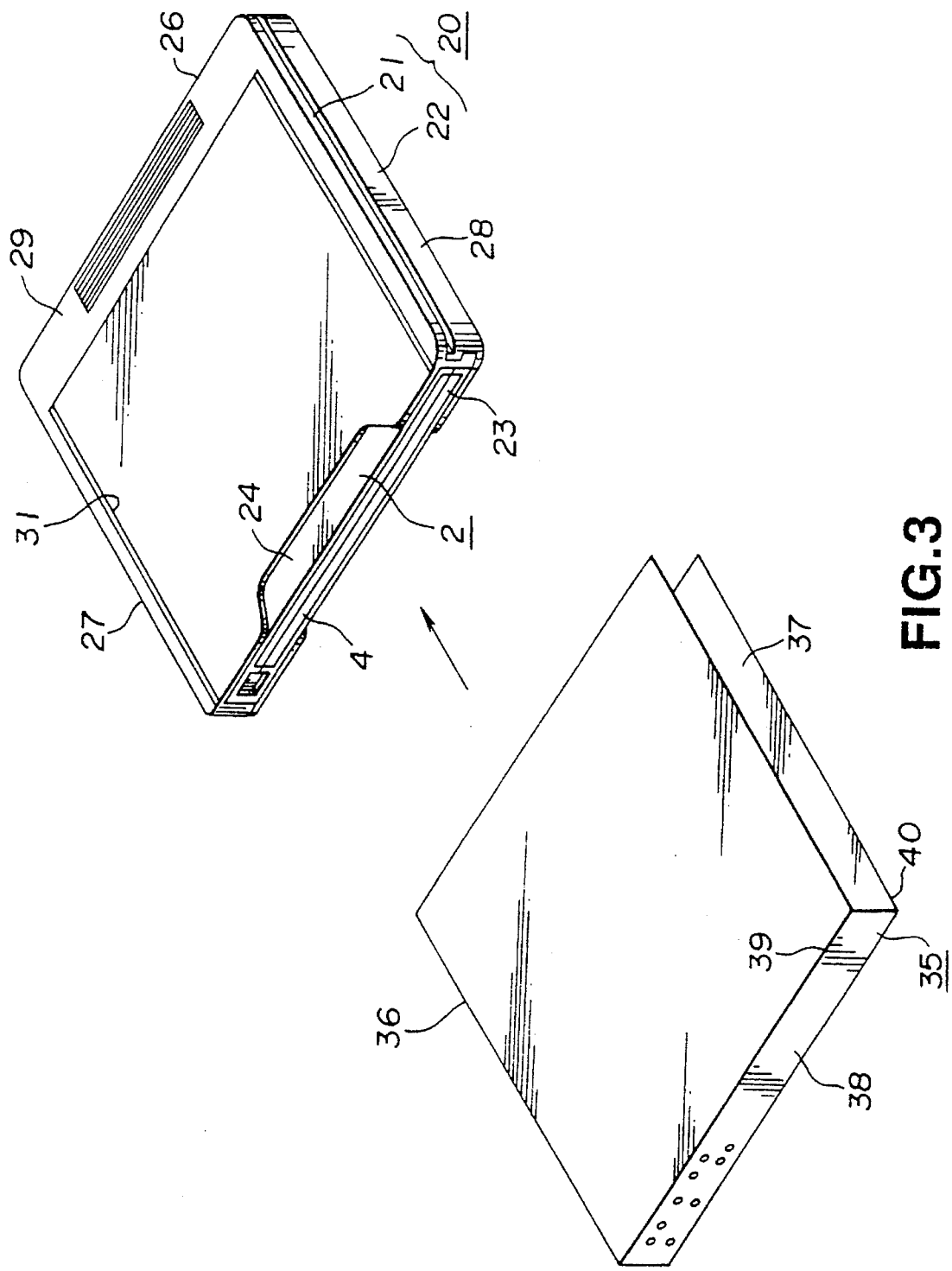
FIG. 3 is a perspective view showing a disc cartridge contained in a container casing.

The disc cartridge 2 is introduced into the above-described container casing 20 via the cartridge inserting/detachment opening 23. The disc cartridge 2, contained in the container casing 20, is partially exposed to outside via the cut-outs 24, 25 to permit the disc cartridge to be gripped by user's hand or finger, as shown in FIG. 3.

Within the container casing 20, there is provided a holding mechanism engaged with a recess formed in the lateral section of the disc cartridge 2 contained therein in order to prevent the disc cartridge 20 from being detached easily from the cartridge inserting/detachment opening 23.

Figure 4:
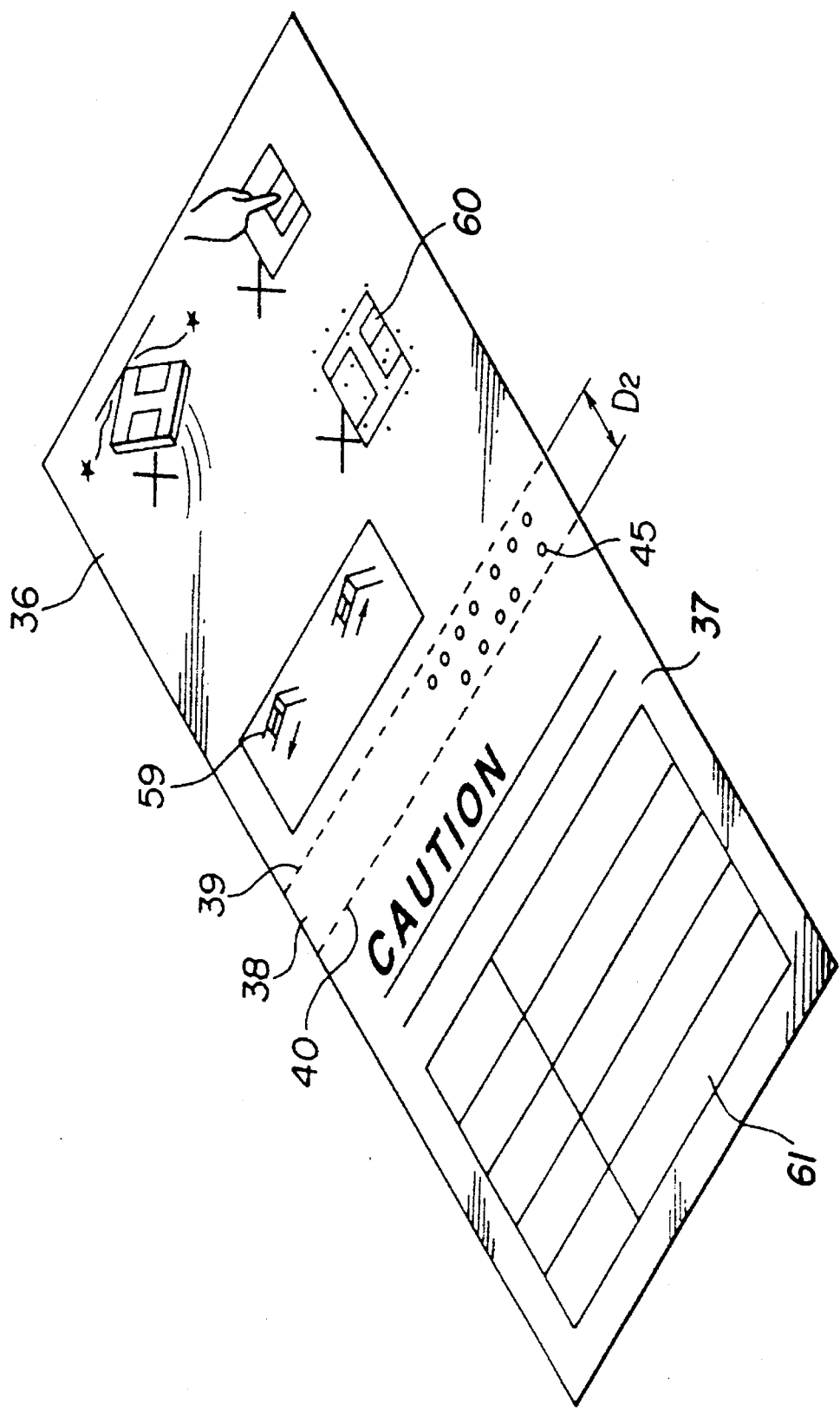
FIG. 4 is a perspective view showing a printed sheet employed in the present invention.

The braille indicating device according to the present invention has a printed sheet 35, such as a so-called index sheet, for sheathing the outer surface of the container casing 20 containing the disc cartridge 2. The printed sheet 35 is a cardboard paper sheet and, as shown in FIG. 4, made up of a first portion 36 extending over and sheathing the planar section 29 of the container casing 20, a second portion 37 extending over and sheathing the planar section 30 of the container casing 20 and a connecting web portion 38 interconnecting the planar portions 29, 30. The connecting web portion 38 has a width $D_2$ substantially corresponding to a thickness $D_1$ of the narrow lateral side section of the cartridge container casing 20.

On the surfaces of the first and second planar portions 36, 37 are provided a pictorial representation 59 or caution 60 indicating handling details for the disc cartridge 2 contained in the container casing 20. The surfaces of the first and second planar portions 36, 37 are also employed as the statement portions for the recording contents of the optical disc 1. If the surfaces of the portions 36, 37 are used for stating the starting portions for the recording contents, a statement column 61, such as ruling, is printed with or without the pictorial representation 59 or the caution 60.

The first and second planar portions 36, 37 of the printed sheet 35 may also be affixed to the label affixture portions 31, 32 provided on the container casing 20 so as to be used as an indicating label.

The printed sheet 35 is formed with weakened portion 39, 40 by perforations formed at interconnecting regions between the planar portions 36, 37 and the connecting web portion 38, as shown in FIG. 4. The planar sections 36, 37 and the connecting web portion 38 can be easily separated from one another along the weakened lines 39, 40. The first and second planar portions 36, 37, severed along the weakened portions 39, 40, are affixed as the occasions may demand on the label affixture portions 15, 31 or 32 provided on the disc cartridge or on the container casing 20.

If the first and second planar portions 36, 37 constituting the printed sheet 35 are employed as the indicating label, an adhesive 42 is previously applied to the back surface of the printed sheet 35 opposite to the surface of the sheet 35 bearing the statement column, such as ruling, for facilitating affixture of the printed sheet 35 to the label affixture portions 15, 31 or 32. This adhesive 42 is sheathed with a thin laminate sheet 43.

Figure 6:
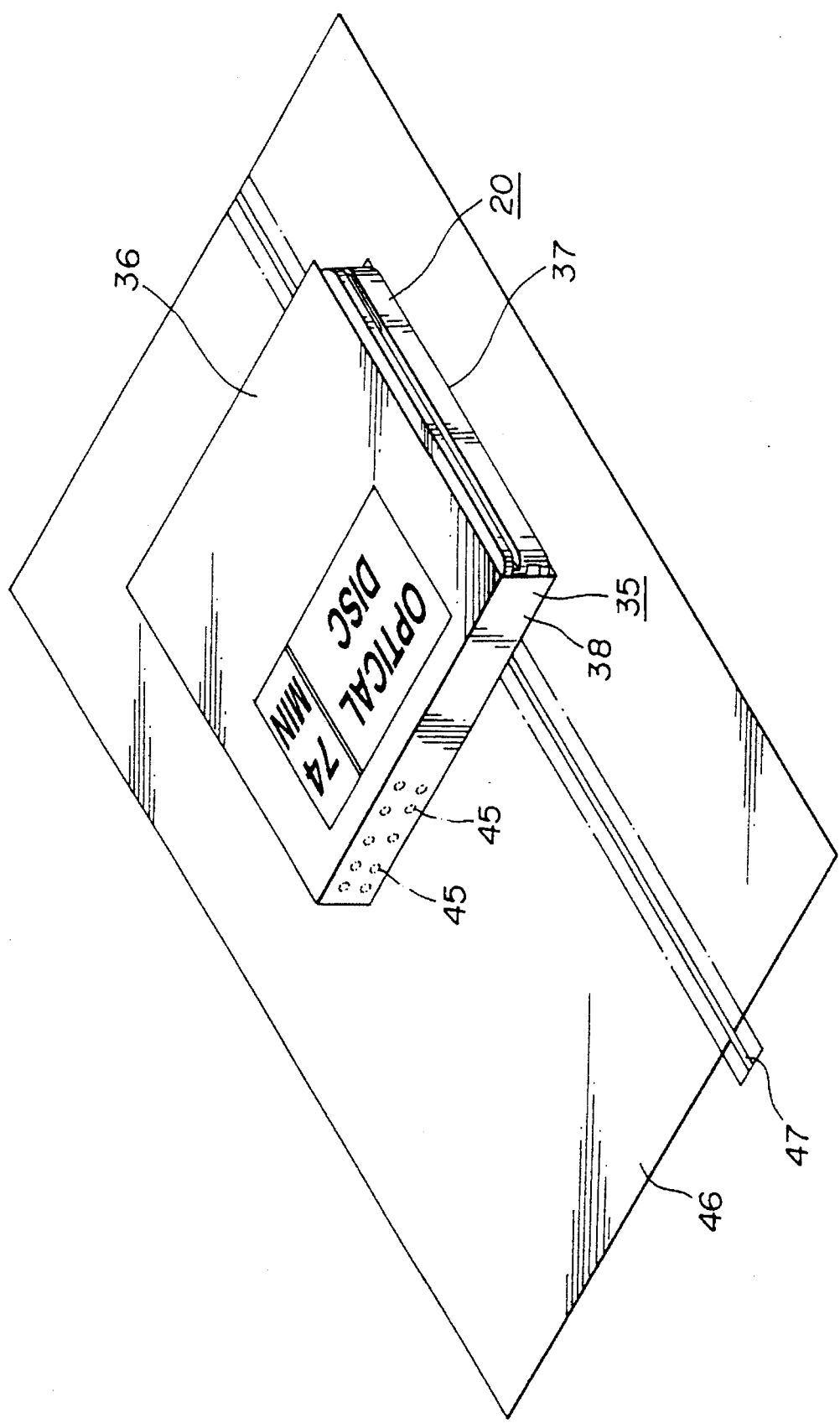
FIG. 6 is a perspective view showing the state of packaging a container casing containing the disc cartridge in a packaging film sheet along with the printed sheet.

The printed sheet 35 is bent along the weakened portions 39, 40 in a U-shape, as shown in FIG. 1. The printed sheet 35 is placed over the outer surface of the container casing 20 so that the first planar portion 29, the cartridge inserting/detachment opening 23 and the opposite planar portion 30 of the casing 20 will be respectively covered by the first planar portion 36, the connecting web portion 38 and by the second planar portion 37, as shown in FIG. 6.

With the printed sheet 35 placed for covering the outer surfaces of the container casing 20, a braille information representing section 45, for indicating the type of the optical disc in braille, is provided on the connecting web portion 38 of the printed sheet 35 constituting the peripheral surface section narrower than the planar portions 29, 30, as shown in FIG. 4.

The braille information representing section 45 represents the information as to whether or not the optical disc 1 contained in the disc cartridge 2 is a replay-only optical disc having information signals such as music signals pre-recorded thereon, or an optical disc capable of re-recording information signals, or the information concerning the optical disc 1 itself, such as the recordable time.

The braille information representing section 45 is constituted by the braille, that is raised letters, made up of minute projections and recesses, formed for projecting along the thickness of the printed sheet 35. The braille information representing section 45 is provided on the surface of the connecting portion 38 which may be touched by the user's hand or finger when the printed sheet 35 is provided on the outer surface of the container casing 20.

The connecting web portion 38, provided with the braille information representing section 45, is constituted by the braille made up of micro-sized irregularities projected or receded along the thickness of the printed sheet 35. The braille information representing section 45 is formed on the surface of the connecting portion 38 that can be touched with the user's finger when the printed sheet 35 is arranged on the outer surface of the container casing 20.

The connecting web portion 38, provided with the braille information representing section 45, faces the narrow lateral side section of the container casing 20, as stated above. This lateral side section faces the outside even when plural container casings 20 are stacked with the planar portions 29, 30 thereof facing one another. Thus, by providing the braille information representing section 45 on this lateral side section, the braille information can be easily discerned by the tactile feeling by the finger's end.

Figure 7:
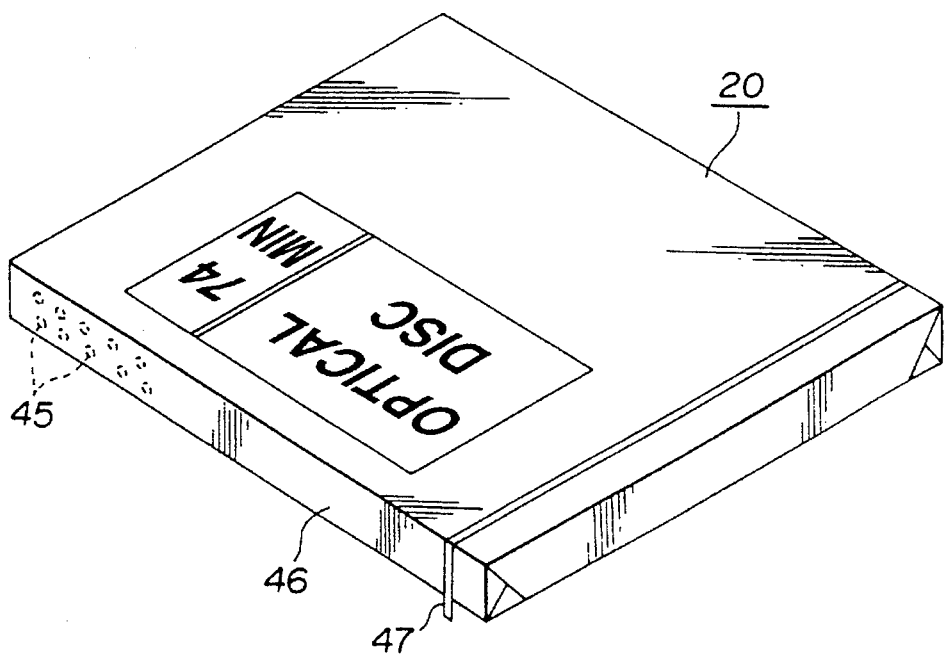
FIG. 7 is a perspective view showing the state of a container casing containing the disc cartridge having been packaged in a packaging film sheet along with the printing sheet.

With the printed sheet 35 applied on the outer surface of the container casing 20, the container casing is wrapped by a packaging film sheet 48, as shown in FIG. 7. The packaging film sheet 48 is a thermally contractible thin sheet of synthetic resin so that the packaged container casing 20 may be seen through from outside. Since the packaging film sheet 46 is formed by the thin sheet, the braille information representing section 45, provided on the printed sheet 35, may be identified by the tactile feeling by the user's hand or finger when the printed sheet 35 is packaged along with the container casing 20. That is, the braille information representing section 45 constituted by the micro-sized irregularities provided on the connecting portion 38 of the printed sheet 35, cause the packaging film sheet 46 to be raised or receded, so that the braille information representing section 45 can be identified by the tactile feeling at the finger's end.

Figure 8:
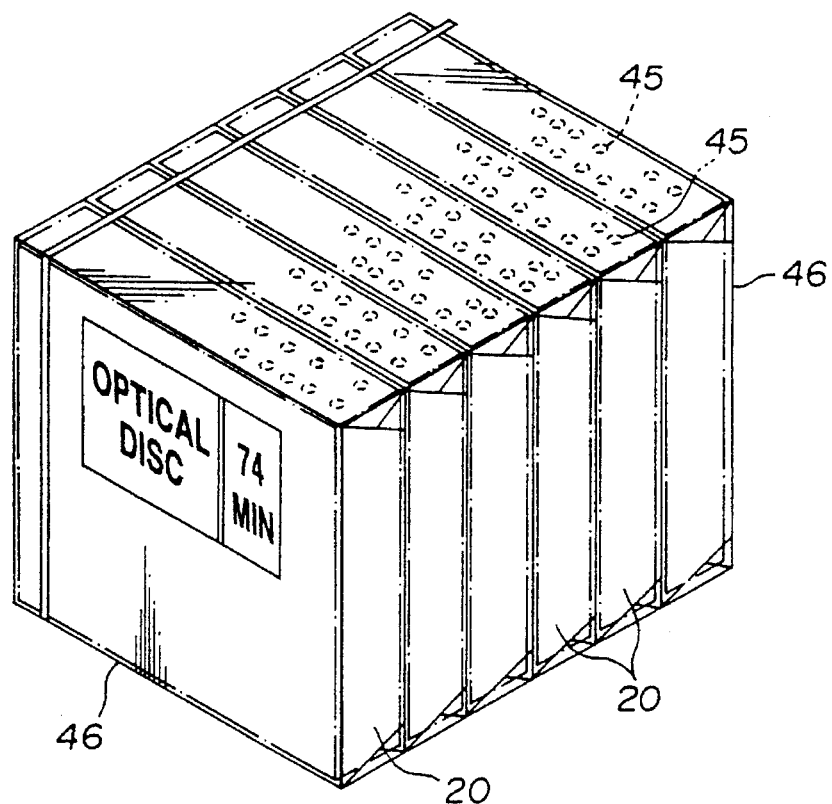
FIG. 8 is a perspective view showing the state of stacking plural disc cartridges shown in FIG. 7.

Thus, even if the outer surface of the container casing 20 is covered by the packaging film sheet 46 and a number of such container casings 20 are stacked as shown in FIG. 8, since the braille information representing section 45 is provided on the connecting portion 38 of the printed sheet 35 facing the lateral side section of the container casing 20 most likely to be touched by the user's finger, and the braille information representing section 45 is covered by the thin packaging film sheet 46, the indication applied to the disc cartridge 2 such as by printing may be easily discerned by the tactile feeing at the finger's end without visually ascertaining the type of the optical disc 1 contained in the container casing 20.

The packaging film sheet 46 for packaging the container casing 20 along with the printed sheet 35 is provided with a tearable tape 47 on its inner surface for facilitating breakage of the wrapping after packaging.

Figure 9:
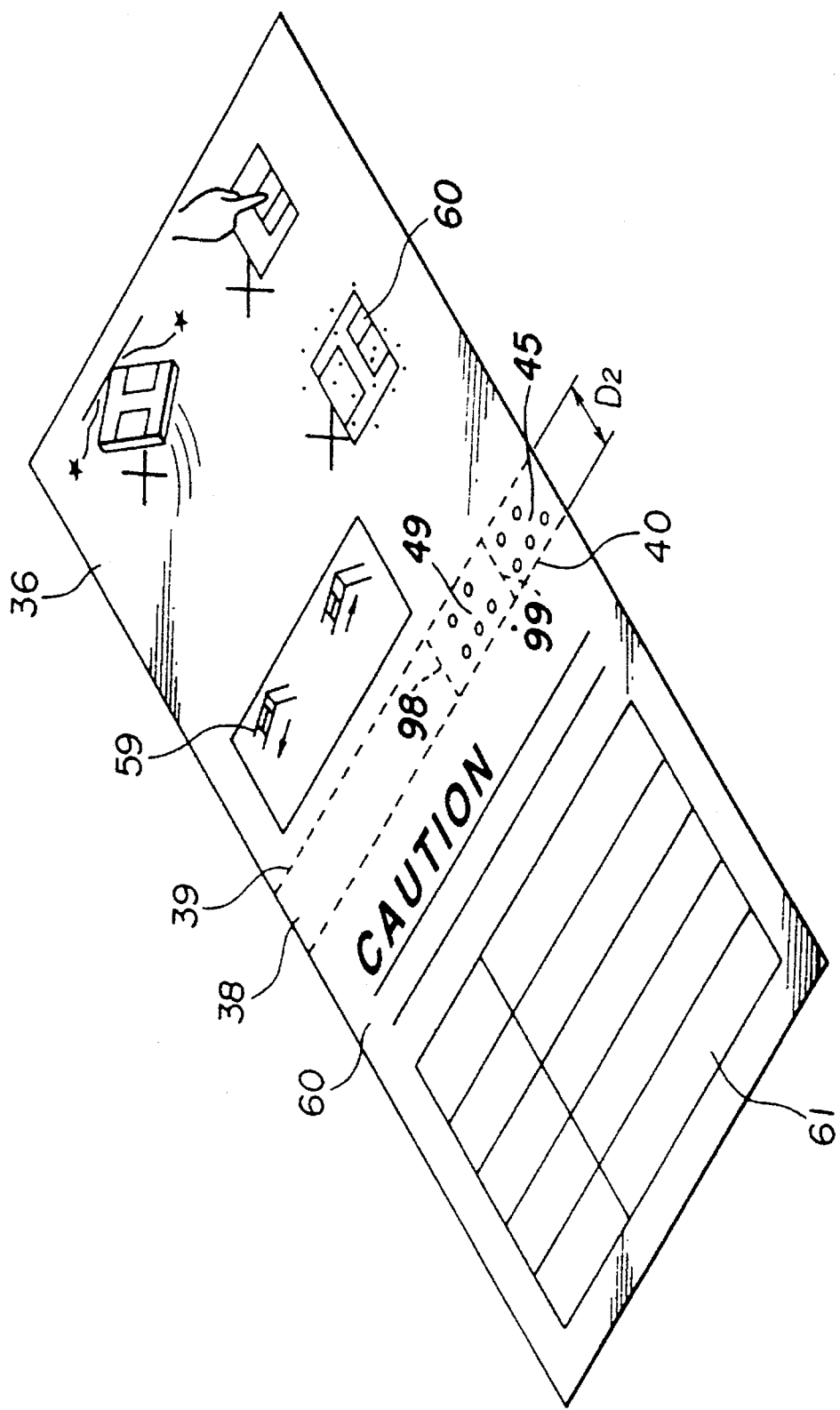
FIG. 9 is a perspective view showing another example of the printed sheet employed in the present invention.

The connecting portion 38 of the printed sheet 35 may be formed with weakened portions 98, 99 extending at right angles to the weakened portions 39, 40 provided at the junction between the first and second planar portions 36, 37 and the connecting web portion 38, for enabling only the portion bearing the braille information representing section 45 to be removed as a separated portion 49, as shown for example in FIG. 9. Similarly to the weakened portions 39, 40, the weakened portions 98, 99 may be formed by perforations.

Figure 10:
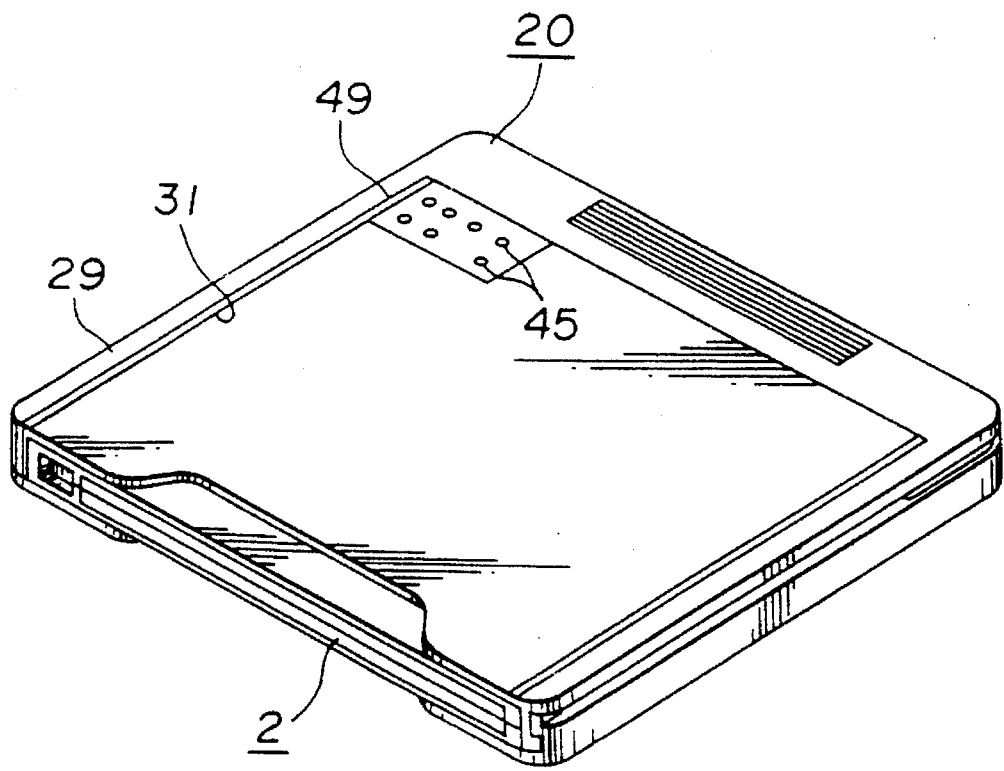
FIG. 10 is a perspective view showing a separated piece having the braille representing means of the printed sheet affixed to the container casing.

The separated portion 49 with the braille information representing section 45, removed from the printed sheet 35 along the weakened portions 39, 40, 98, 99 is affixed to a part of the planar portion 29 or 30 of the opened container casing 20, as shown in FIG. 10. By affixing the removed portion 49, carrying the braille information representing section 45, to the container casing 20, the type of the optical disc 1 within the disc cartridge 2 contained in the container casing 20 may be discriminated even after opening by the separated piece 49 now affixed to the optical disc.

Since the separated piece 49 is of a width corresponding to the narrow lateral side section of the container casing 20, the piece 49 may be affixed to the narrow lateral side section of the container casing 20. Alternatively, the piece 49 may be affixed to the label affixture portion 15 of the disc cartridge 2. Thus the printed sheet 35 having the separable braille information representing section 45 may be flexibly employed as an information indicating portion indicating the type of the optical disc 1 within the disc cartridge 2 contained in the container casing 20.

In the above-described embodiment, the disc cartridge 2 is contained in the container casing 20 and packaged in this state by the packaging film sheet 46. However, the disc cartridge may also be directly packaged on its outer surface by the packaging film sheet 46 without being contained in the container casing 20. Such arrangement represents a second embodiment which is now explained by referring to the drawings. The parts or components similar to those of the first embodiment are denoted by the same reference numerals and the corresponding description is not made for simplicity.

Figure 11:
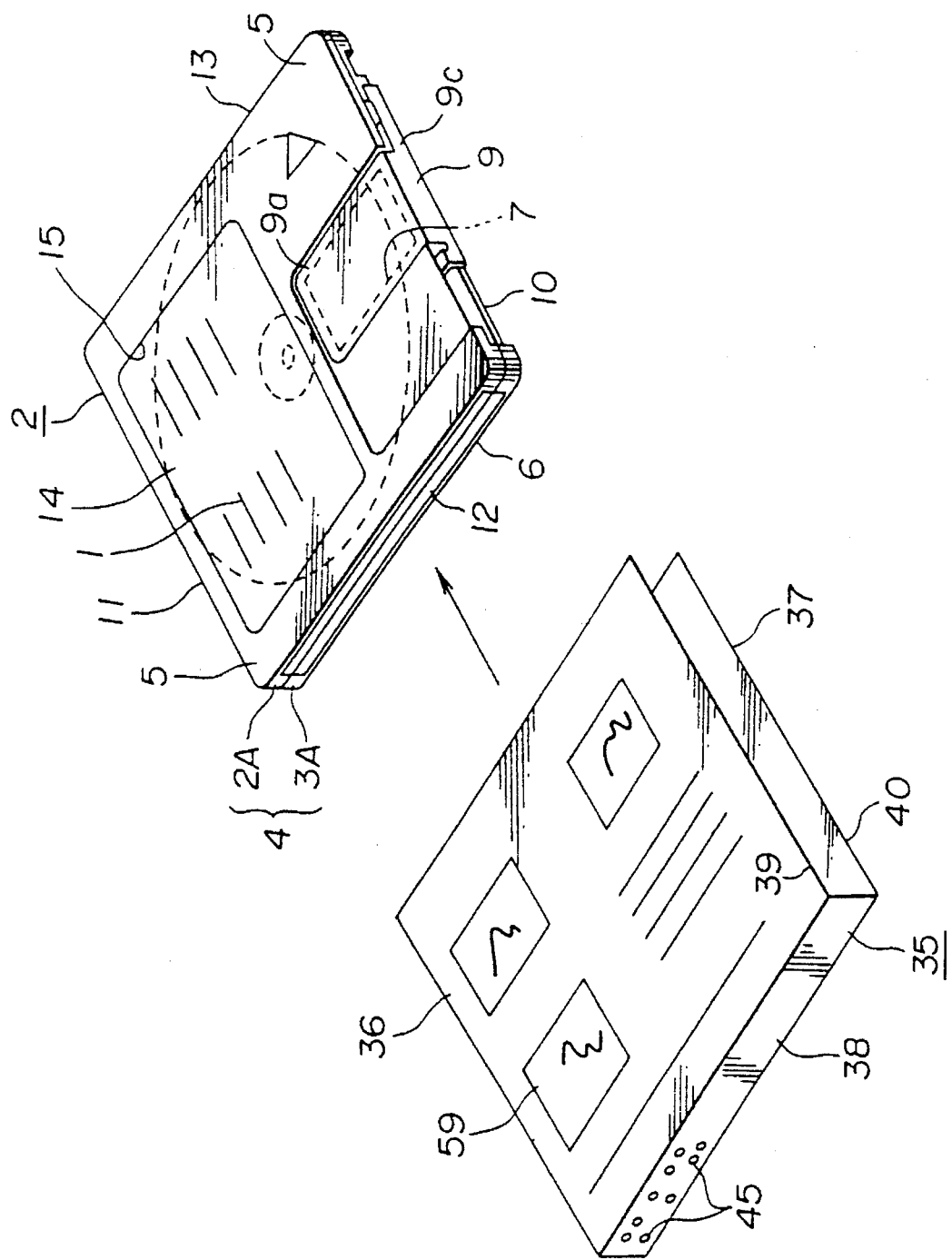
FIG. 11 is an exploded perspective view showing a braille representing device according to a second embodiment of the present invention.

With the present embodiment, the printed sheet 35 is placed for directly covering the outer surface of the disc cartridge 2. That is, the printed sheet 35 is bent in a substantially U-shape along the weakened portions 39, 40, in the shape of a letter U, as shown in FIG. 11, as when the printed sheet is applied onto the outer surface of the container casing 20. The printed sheet 35, bent in a U-shape, is placed on the outer surface of the disc cartridge 2 so that the planar portion and the opposite side planar portion interconnected by the lateral side section 12 are respectively sheathed by the first and second planar portions 36 and 37 interconnected by the connecting web portion 38 carrying the braille information representing section 45.

Figure 12:
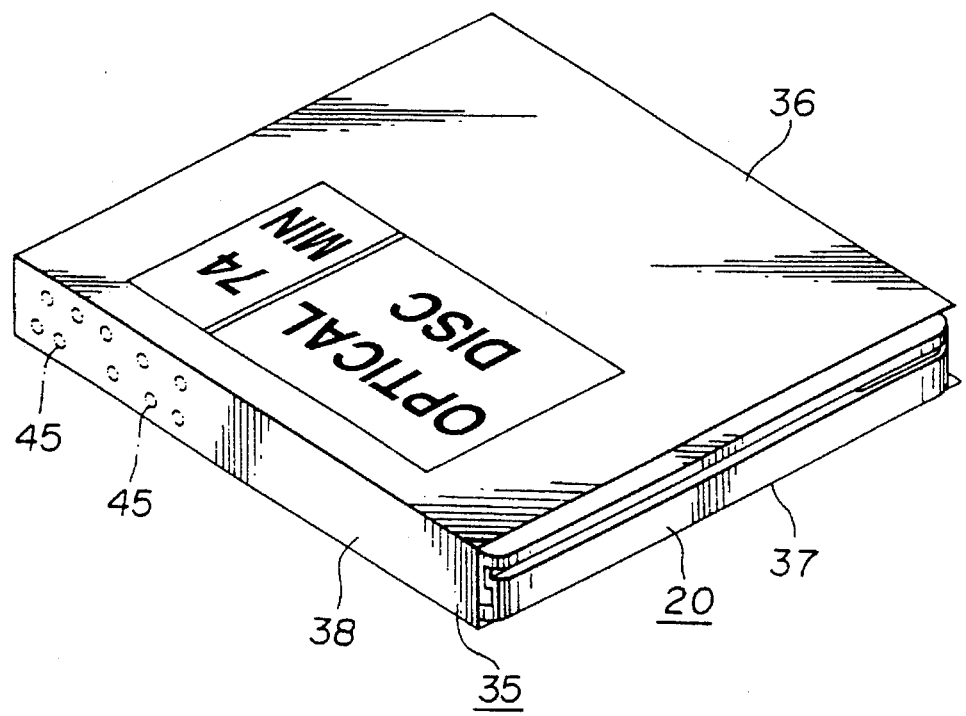
FIG. 12 is a perspective view showing a disc cartridge wrapped in a printed sheet.

The connecting web portion 38 carrying the braille information representing section 45 faces the narrow lateral section 12 of the disc cartridge 2, as shown in FIG. 12. The lateral section 12 of the disc cartridge 2, faced by the braille information representing section 45, provided on the connecting web portion 38, faces the outside, even when a plurality of the disc cartridges 2 are stacked with the planar portions 5, 6 facing one another, so that the lateral side section 12 can be touched by the finger. Consequently, the braille information representing section 45 is placed at a position readily touched by the finger even when a number of disc cartridges 2 are stacked together.

Figure 13:
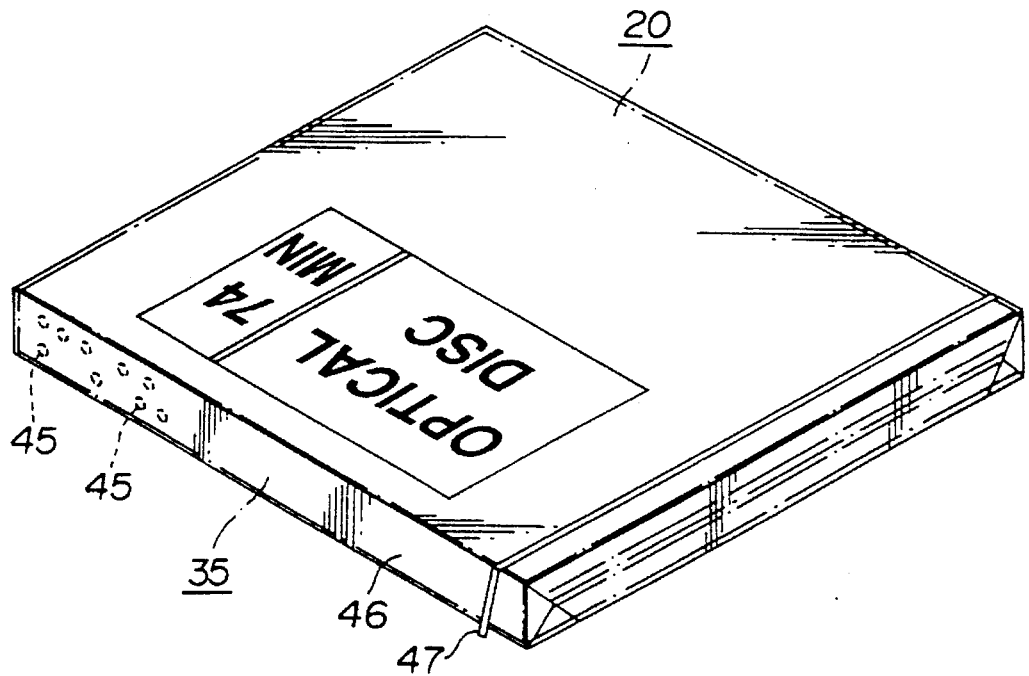
FIG. 13 is a perspective view showing a disc cartridge wrapped in a printed sheet and further wrapped in a packaging film sheet.

The disc cartridge 2, having the printed sheet 35 placed on its outer surface, is packaged by a packaging film sheet 46 constituted by a packaging film sheet 46 formed by a thin sheet of thermally contractible synthetic resin, as shown in FIG. 13. The braille information representing section 45, provided on the printed sheet 35 packaged by the packaging film sheet 46 along with the disc cartridge 2, may be discerned by the tactile feeling at the finger's end because of the thin thickness of the packaging film sheet 46. That is, since the packaging film sheet 46 is thin in thickness, the sheet 46 is flexed along the micro-sized irregularities of the braille information representing section 45, so that the braille information representing section 45 constituted by the micro-sized irregularities on the connecting portion 38 of the printed sheet 35 may be discerned by the tactile sense at the finger's end.

Although the braille information representing section 45 is provided on the printed sheet 35 placed for covering the outer surface of the container casing 20 or the disc cartridge 2, such braille information representing section 45 may also be directly provided on the packaging film sheet 46. That is, the braille information representing section 45 is provided at the position of the packaging film sheet 46 facing the narrow lateral side section of the container casing 20 when the container casing is packaged.

The braille information representing section 45 provided on the packaging film sheet 46 is constituted by a foaming ink presenting micro-sized irregularities on printing. Since it suffices if the braille information representing section 45 is formed as micro-sized irregularities on the packaging film sheet 46, the section 45 may also be formed by embossing on the packaging film sheet 46.

If the braille information representing section 45 is directly provided on the packaging material for packaging the container casing 20 or the disc cartridge 2, there is no necessity of employing the thin packaging film sheet 46 since the irregularities formed on the printed sheet need not be sensed by the finger through the packaging film sheet as in the above-described embodiment. Consequently, a packaging film sheet employed may be of a larger thickness than the packaging film sheet 46.

Figure 14:
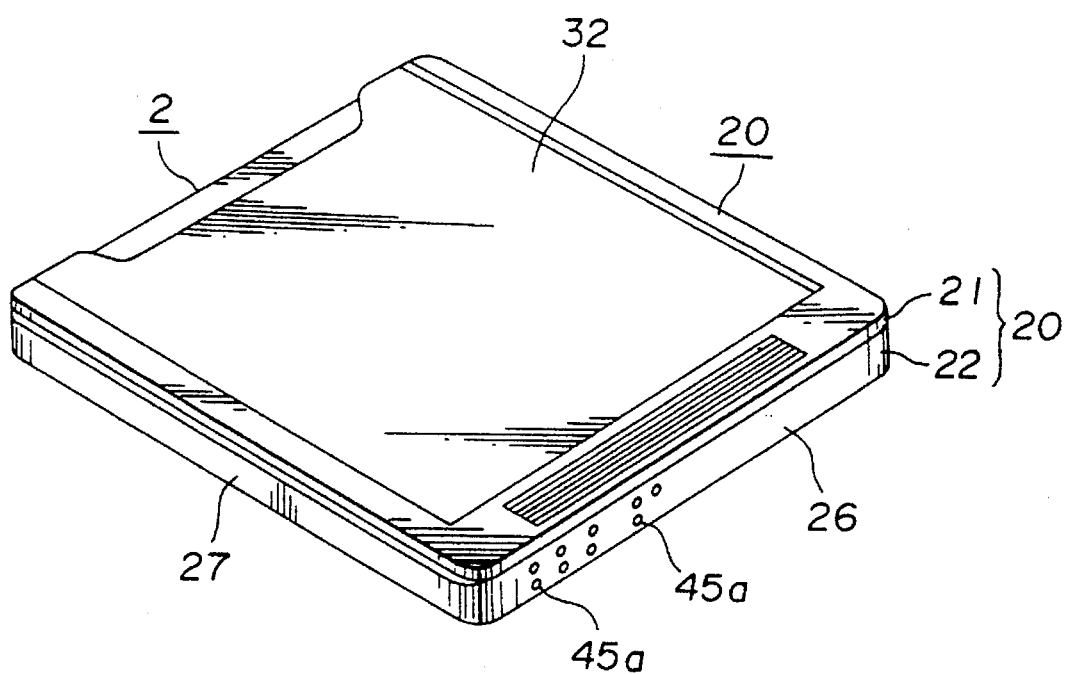
FIG. 14 is an exploded perspective view showing a braille representing device according to a third embodiment of the present invention.

Referring to FIG. 14, a third embodiment of the present invention will be explained. The parts or components similar to those of the first embodiments are correspondingly numbered. The printed sheet 35 covering the container casing 20 containing the disc cartridge 2 is provided with a braille information representing section 45a. However, the braille information representing section 45a may also be provided on the narrow lateral side section of the container casing 20 containing the disc cartridge 2. Specifically, the braille information representing section 45 is provided on the narrow back lateral surface 26 of the container casing 20, as shown in FIG. 14. This back lateral section 26 represents an outwardly exposed portion even when the outer surface of the container casing 20 is sheathed by the printed sheet 35 bent in the U-shape. The braille information representing section 45, provided on the back lateral section 26 of the printed sheet 35 bent in the U-shape, can be discerned by the tactile feeling at the finger's end via the packaging film sheet 46 when the container casing 20 is packaged by the packaging film sheet 46 along with the printed sheet 35.

Although the above description has been made in connection with packaging of the disc cartridge 2 containing the optical disc 1, the present invention may also be directed to the packaging of a tape cartridge containing the optical disc 1.

Referring to FIGS. 15 to 18, a fourth embodiment of the present invention will be explained in detail.

The disc cartridge has a cartridge main body 72 containing a disc 71 as shown in FIGS. 15 to 18.

Figure 15:
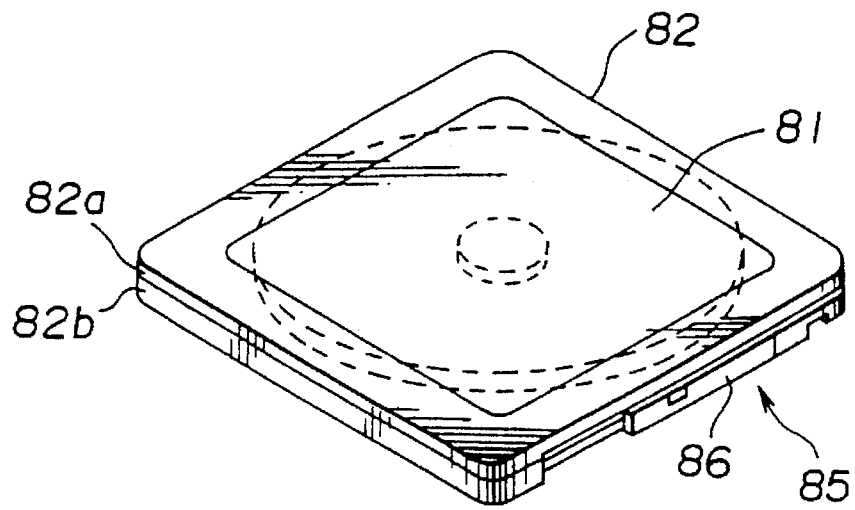
FIG. 15 is an exploded perspective view showing a braille representing device according to a fourth embodiment of the present invention.
Figure 16:
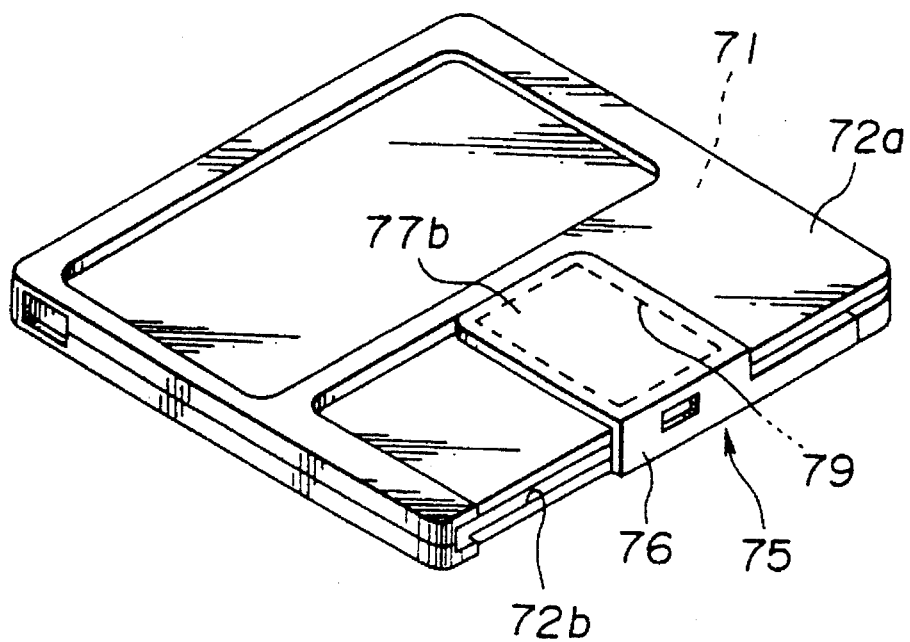
FIG. 16 is a perspective view showing a recording/replay only disc cartridge employed in the fourth embodiment of the present invention, as viewed from above.
Figure 17:
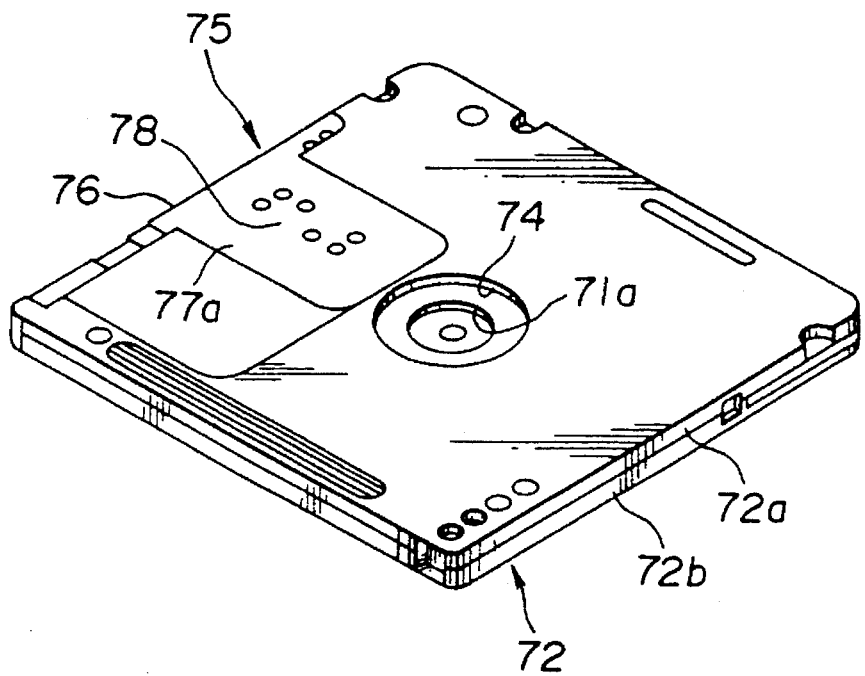
FIG. 17 is a perspective view showing a recording/replay only disc cartridge employed in the fourth embodiment of the present invention, as viewed from below.
Figure 18:
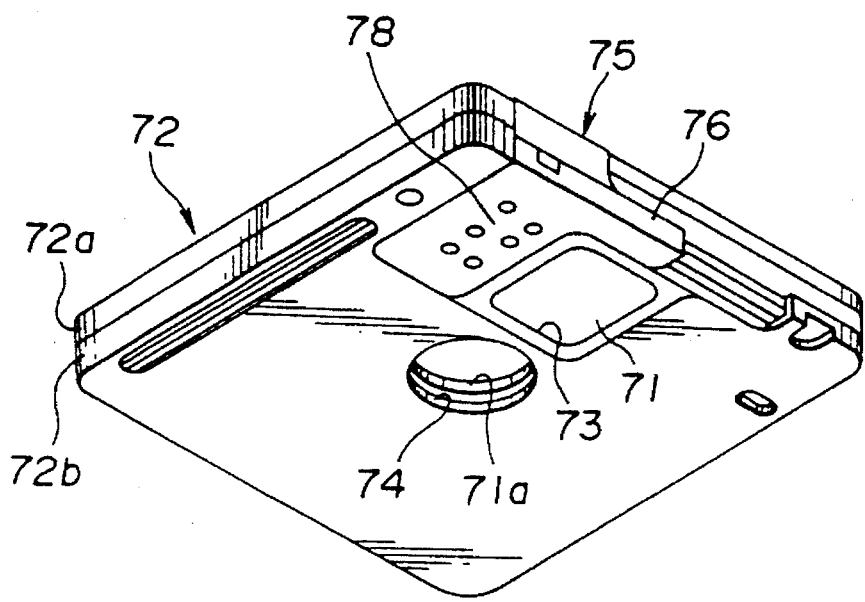
FIG. 18 is a perspective view showing the shutter member having been moved to a position of opening an aperture for an optical pickup device of a disc cartridge.

FIG. 15 shows a replay-only disc cartridge, while FIGS. 16 to 18 illustrate a recording/reproducing disc cartridge. A replay-only optical disc similar to the so-called compact disc is contained in the disc cartridge shown in FIG. 15, while a re-recordable optical disc, such as a magneto-optical disc, is contained in the disc cartridge shown in FIGS. 16 to 18. The disc 71 is formed with a center aperture 71a by means of which the disc is held by a disc rotating driving unit of a disc recording and/or reproducing apparatus adapted for writing and/or reading information signals on or from the signal recording layer of the disc. With the disc 71, a pre-set area extending from the inner periphery as far as the outer periphery of the disc represents the signal recording region.

The cartridge main body 72 is formed as a substantially rectangular thin casing capable of holding the disc 71 by abutting and interconnecting an upper half 72a and a lower half 72b formed of a synthetic resin, such as an ABS resin. Within this cartridge main body 72 is contained the disc 71 so that its major surface as the signal recording surface faces the lower half 72b and its opposite major surface faces the upper half 72a.

Figure 19:
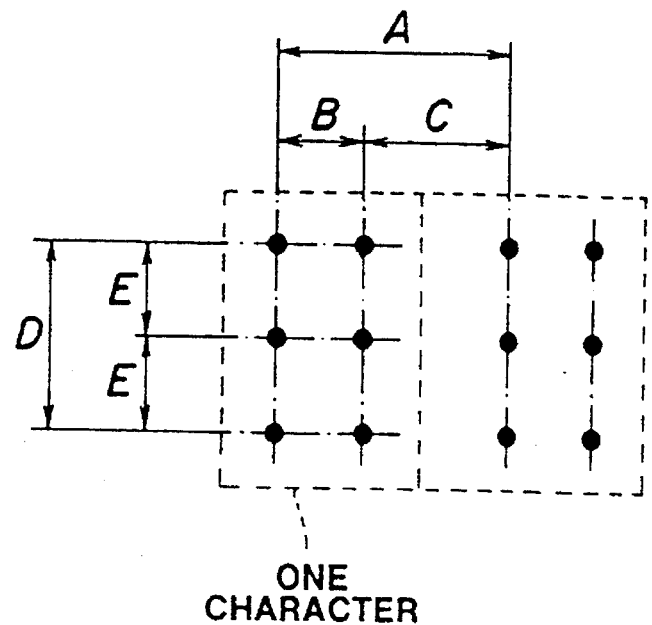
FIG. 19 is a diagrammatic view showing a braille size adopted in general in Japan.

The upper half 72a and the lower half 72b of the disc cartridge for recording/reproduction, containing the magneto-optical disc as the recordable optical disc, are respectively formed with an aperture 79 for a magnetic head for generating an external magnetic field, and an aperture 73 for an optical pickup, as shown in FIG. 19. These apertures 73, 79 are substantially rectangular openings extending from near the center of the lower half 72b as far as the vicinity of a lateral side of the lower half 72b, that is as far as the vicinity of a lateral side of the cartridge main body 72. These apertures 73, 79 are dimensioned so that the optical pickup and the magnetic head may be moved along the disc radius from the inner periphery towards the outer periphery of the disc.

At a mid part of the lower half 72b is formed a substantially circular chucking aperture 74 for exposing a center hole 71a of the disc 71 and its periphery towards outside. The disc table of the disc rotating driving unit of the disc recording/reproducing apparatus (disc player) is intruded via this chucking aperture 74 into the cartridge main body 72 for holding the disc 71.

The recording/reproducing disc cartridge shown in FIGS. 16 to 18 is fitted with a shutter member 75 for opening and closing the aperture 73 for the optical pickup and an aperture 81 for the magnetic head. The shutter member 75 has a connecting web portion 78, a pair of shutter plate portions 77a, 77b connected by the connecting web portion 76 and an inserting plate portion, not shown, and is formed by bending a metal sheet material into a substantially U-shaped cross-section. The shutter member 75 is mounted on the cartridge main body 72 for movement between positions of closing and opening the apertures 73, 79 by the shutter members 77a, 77b. The shutter member 75 is movably mounted by having the inserting plate portion, not shown, inserted into a groove formed in the sidewall section of the cartridge main body 72, and is locked by lock means, not shown, provided in the cartridge main body 72, at a position of closing the apertures 73, 79. The locking by the lock means is released at the time of loading the disc cartridge on the disc recording/reproducing apparatus so that the shutter member 75 is moved to an opening position.

The replay-only disc cartridge has a cartridge main body 82 made up of upper and lower halves 82a, 82b, as shown in FIG. 15. A replay-only optical disc is contained in the cartridge main body 82. The lower half 82b is basically identically constructed as the lower half 72b and has an aperture for the optical pickup and an aperture for the disc table. The details of the lower half is not shown for simplicity. In distinction from the recording/replay disc cartridge, the upper half 82a is planar since it is not provided with the aperture for generating the external magnetic field. The disc cartridge shown in FIG. 15 has the shutter member 85 which is provided with shutter plate portions, not shown, provided with the aperture for the optical pickup of the lower half 82b, and a connecting web portion 86. The shutter plate portions of the shutter member 85 is configured similarly to the shutter plate portion 77a of the shutter member 75 shown in FIG. 17. The connecting web portion 86 is formed integrally with the shutter plate portions, not shown, and has its distal end inserted into a groove formed in the lateral surface of the cartridge main body 82. As a result, the shutter member 85 is moved between the positions of opening and closing the aperture for the pickup unit. The shutter member 85 is formed in a substantially L-shaped cross-section by bending a metal sheet to form the shutter plate portions and the connecting web portion 86. Similarly to shutter member for the recording/reproducing disc cartridge, the shutter member 85 is locked by lock means, not shown, at the position of closing the aperture for the optical pickup unit.

The shutter plate portion 77a of the shutter member 75 has braille representation (braille points) 78, as convexed discriminating indication showing the recordable capacity or recordable time of the disc, as shown in FIGS. 17 and 18. The shutter plate portion of the shutter member 85 similarly has braille characters. The following description is made of the shutter member 75.

The braille characters 78 inscribed on the shutter plate portion 77a of the shutter member 75 are each of a dot size of 1.5 mm in diameter which is the Japanese standard size of the braille characters with use of the paper sheet. Since the braille letters are not crushed with the use of the shutter member 75 as in the case of using the paper sheet, the braille letter 78 is set to a height on the order of 0.2 mm. For facilitating reading of the braille letters 78, the dot pitch of the braille letters 78 pursuant to the standard for the braille letters of USA which is slightly larger than the usual size. The braille letters 78 are in the form of micro-sized irregularities projected or recessed in the direction of thickness of the shutter plate portion 77a.

Under the usual braille letter standard in Japan, each character is represented by six dots at the maximum, each dot interval being 2.3 mm vertically and 2.1 mm horizontally, each character being 4.6 mm by 2.1 mm and the character interval being 3.0 mm, as shown in FIG. 19.

Figure 20:
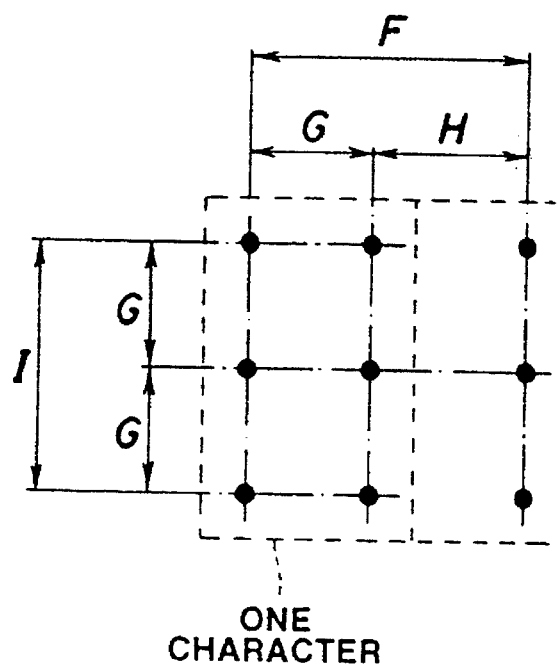
FIG. 20 is a diagrammatic view showing a braille size adopted in general in the USA.

Under the braille letter standard in USA, each character is represented by six dots at the maximum, each dot interval being 0.009 inch (2.288 mm) vertically and 0.09 inch (2.288 mm) horizontally, each character being 0.18 inch (4.572 mm) by 0.25 inch (6.35 mm) and the character interval being 0.16 inch (4.084 mm), as shown in FIG. 20.

If the braille letters 78 inscribed on the shutter plate portion 77a is obviously a numeral, the braille letters for letters 0 to 9 are represented using 1 to 4 dots, as shown in Table 1.

TABLE 1

| .⁻ | .⁻ | .. | .. | .⁻ | .. | .. | .⁻ | ⁻. | ⁻. |
| ⁻⁻ | .⁻ | ⁻⁻ | ⁻. | ⁻. | .⁻ | .. | .. | .⁻ | .. |
| ⁻⁻ | ⁻⁻ | ⁻⁻ | ⁻⁻ | ⁻⁻ | ⁻⁻ | ⁻⁻ | ⁻⁻ | ⁻⁻ | ⁻⁻ |
| 1 | 2 | 3 | 4 | 5 | 6 | 7 | 8 | 9 | 10 |

If the braille letters 78 are a combination of numerals and characters, they are represented by prefixing keys indicated by four dots before the numerals as shown in table 2.

TABLE 2

| ⁻..⁻ | ⁻..⁻ | ⁻.... | ⁻.... | ⁻..⁻ | ⁻.... | ⁻.... | ⁻..⁻ | ⁻⁻. | ⁻⁻. |
| ⁻.⁻⁻ | ⁻..⁻ | ⁻.⁻⁻ | ⁻.⁻. | ⁻.⁻. | ⁻..⁻ | ⁻.... | ⁻.... | ⁻..⁻ | ⁻.... |
| ..⁻⁻ | ..⁻⁻ | ..⁻⁻ | ..⁻⁻ | ..⁻⁻ | ..⁻⁻ | ..⁻⁻ | ..⁻⁻ | ..⁻⁻ | ..⁻⁻ |
| 1 | 2 | 3 | 4 | 5 | 6 | 7 | 8 | 9 | 10 |

In the example shown in FIG. 17, the braille letters indicating the recordable time of 60 minutes are inscribed on the shutter plate portion 77a.

For recessed discriminating indication on the shutter plate portion 77a of the shutter member 75, arabic letters, such as 60, may be directly inscribed for showing the recordable time. However, as compared to the arabic letters, the braille letters are lesser in inscription area than the arabic letters, so that distortion to the shutter plate surface region around the characters is less than in the arabic letters. However, the braille letter is thought to be more agreeable to the blind and weakly sighted persons in consideration that it is the braille characters that is preferentially used in automatic ticket vendors in railway stations or on taxi doors.

Figure 5:
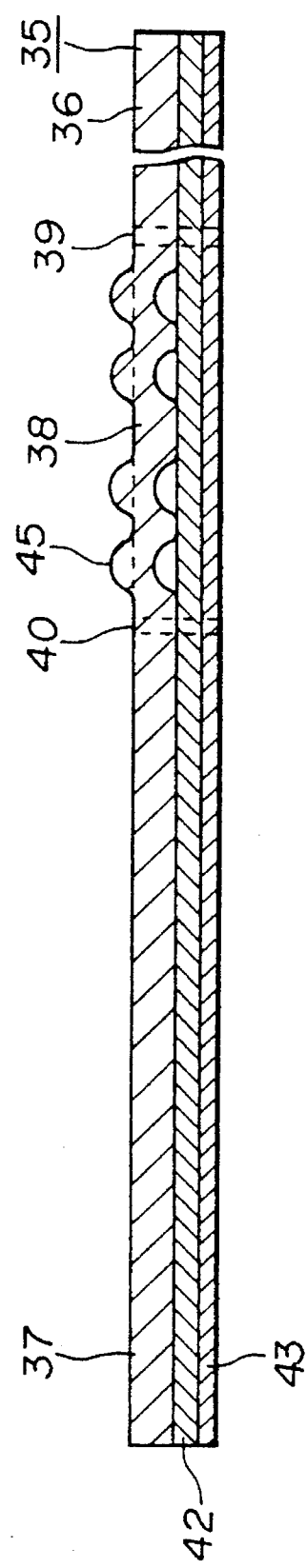
FIG. 5 is an enlarged longitudinal cross-sectional view of the printed sheet.

For producing the shutter member 75, as constituent elements of the disc cartridge according to the fourth embodiment, having the braille points as convexed discriminating indication on the shutter plate portion 77a, the shutter member 75 is produced by forward feed press working process comprising punching a thin metal plate, inscribing braille points indicating the recordable time, for example, by press working in accordance with the rule shown in FIG. 5, followed by bending and severing.

Although the shutter member 75 is formed from the thin metal plate, the present invention is not limited thereto, and may be applied to a shutter member formed of a synthetic material.

With a disc cartridge according to a fourth embodiment, the type of the disc cartridge, recording capacity or the recording time may be determined by the blind or weakly sighted user touching the braille letters 78 indicating the type of the information recording medium inscribed on the shutter member provided in the cartridge main body 72 containing the information recording medium.

Thus it is possible for the blind or weakly sighted user to discriminate the disc cartridge easily and correctly in an extremely short time in order select the desired disc cartridge for recording or reproduction.

Since the braille points 78 are inscribed on the shutter plate portion 77a of the shutter member 75, the time necessary for exchanging the cores of the metal molds for the shutter member 75 depending on the type of the shutter member during fabrication of the disc cartridge may be drastically reduced to approximately one-seventh.

Thus it becomes possible to increase the production efficiency to improve the product yield significantly.

When inscribing the braille points on the upper half or lower half of the cartridge main body, the region around the braille points need be recessed in order for the thickness of the disc cartridge in its entirety to be not changed. Thus the representation becomes difficult to read by the blind or weakly sighted users. In the fourth embodiment, the shutter plate portion 77a of the shutter member 75 for inscribing the braille letters is of lower height than the upper or lower half, only the braille points may be protruded to facilitate the discrimination significantly.

In addition, the shutter member 75 is formed of a material, such as metal, different from the material of the cartridge main body 72. Thus it is possible for the blind or weakly sighted users to comprehend the position of the shutter member 75 on which the convexed or recessed indication is formed for indicating the convexed or recessed discriminating indication showing the type of the information recording medium and to find the braille points by their tactile sense. Consequently, it is possible for the blind or weakly sighted users to determine the type of the disc cartridge in an extremely short time.

What is claimed is:

1. A device for representing braille points on an information recording medium comprising:

a cartridge main body, in the form of a rectangular casing for containing the information recording medium, having a pair of rectangular-shaped planar portions and plural lateral side sections provided along sides of said planar portions interconnecting said planar portions;

sheathing means including a sheet having a free perimeter and which sheathes an outer surface of said cartridge main body, and a braille point representing means provided on said sheathing means at a position thereof readily touched by the hand or finger which indicates the type of the information recording medium contained in the cartridge main body, wherein said sheathing means comprises a lateral connecting web portion between first and second planar portions of said sheathing means which faces at least one of the lateral side sections of the cartridge main body; and wherein said braille point representing means is provided on said lateral connecting web portion which is narrower than said planar portions of the sheathing means.

2. A device for representing braille points as claimed in claim 1, further comprising:

a packaging film sheet wrapped around the sheathing means and the cartridge main body;

wherein said film sheet is a thermally contractible thin sheet of synthetic resin which allows tactile identification of the braille point representing means provided on said sheathing means even when the sheathing means is wrapped with said film sheet.

3. A device for representing braille points as in claim 1, further comprising:

first and second weakened portions formed at interconnecting regions between said first planar portion and the connecting web portion and said second planar portion and the connecting web portion, respectively.

4. A device for representing braille points as claimed in claim 3, further comprising:

second and third weakened portions extending within the connecting web portion at right angles to both of the first and second weakened portions for enabling the braille point information representing portion to be removed as a separated portion for being affixed to one of the rectangular-shaped planar portions of the cartridge main body.

5. A device for representing braille points as claimed in claim 3 or 4, wherein said weakened portions are formed by perforations.

6. In combination, a printed sheet having a free perimeter and a cartridge main body containing an information signal recording medium, comprising the comprising:

a first planar portion having edges which cover at least a part of one of a pair of rectangular-shaped planar portions of the cartridge main body having said planar portions and plural lateral side sections provided along sides of said planar portions interconnecting said planar portions, a second planar portion having edges which cover at least a part of the other of said planar portions of the cartridge main body, a lateral connecting web portion connected between a first edge of said first planar portion and a first edge of said second planar portion which faces at least one of the lateral side sections of the cartridge main body, and a braille point information representing portion formed on said connecting web portion which indicates the type of the information signal recording medium contained in the cartridge main body, wherein the connecting web portion is narrower than either of the first and second planar portions of the printed sheet and interconnects those planar portions.

7. The printed sheet as claimed in claim 6 further comprising:

first and second weakened portions formed at interconnecting regions between said first planar portion and the connecting web portion and said second planar portion and the connecting web portion, respectively.

8. The printed sheet as claimed in claim 7, further comprising:

second and third weakened portions extending within the connecting web portion at right angles to both of the first and second weakened portions for enabling the braille point information representing portion to be removed as a separated portion for being affixed to one of the rectangular-shaped planar portions of the cartridge main body.

9. The printed sheet as claimed in claim 7 or 8, wherein said weakened portions are formed by perforations.

* * * * *